United States Patent
Kim et al.

(10) Patent No.: US 9,356,290 B2
(45) Date of Patent: May 31, 2016

(54) COMPOSITE CATHODE ACTIVE MATERIAL, CATHODE AND LITHIUM BATTERY THAT INCLUDE THE COMPOSITE CATHODE ACTIVE MATERIAL, AND METHOD OF PREPARING THE COMPOSITE CATHODE ACTIVE MATERIAL

(75) Inventors: Gue-sung Kim, Yongin-si (KR);
Ryoung-hee Kim, Yongin-si (KR);
So-yeon Kim, Suwon-si (KR);
Woon-jung Paek, Busan (KR);
Min-sang Song, Seongnam-si (KR);
Young-min Choi, Suwon-si (KR);
Won-chang Choi, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 486 days.

(21) Appl. No.: 13/493,366

(22) Filed: Jun. 11, 2012

(65) Prior Publication Data

US 2013/0112915 A1    May 9, 2013

(30) Foreign Application Priority Data

Nov. 8, 2011    (KR) .................. 10-2011-0115923

(51) Int. Cl.
*H01M 4/58*    (2010.01)
*H01M 4/131*    (2010.01)
*H01M 10/052*    (2010.01)

(52) U.S. Cl.
CPC ............. *H01M 4/58* (2013.01); *H01M 4/131* (2013.01); *H01M 4/5825* (2013.01); *H01M 10/052* (2013.01); *Y02E 60/122* (2013.01); *Y02T 10/7011* (2013.01)

(58) Field of Classification Search
CPC ..... H01M 4/58; H01M 4/5825; H01M 3/131; H01M 10/052
USPC ......................................... 252/182.1; 229/224
See application file for complete search history.

(56) References Cited

U.S. PATENT DOCUMENTS

| 5,139,901 A | 8/1992 | Kawaguchi et al. |
| 2006/0263686 A1* | 11/2006 | Zhao .............................. 429/211 |
| 2011/0020706 A1* | 1/2011 | Nesper ..................... H01M 4/58 429/231.8 |

(Continued)

FOREIGN PATENT DOCUMENTS

| EP | 1 028 477 A2 | 8/2000 |
| EP | 1 028 477 A3 | 8/2000 |

(Continued)

OTHER PUBLICATIONS

Zhi, C. Y., et al., "Boron carbonitride nanotubes," J. Nanosci. Nanotech., 2004, 4, 35-51.*

(Continued)

*Primary Examiner* — Liam J Heincer
*Assistant Examiner* — Nicholas Hill
(74) *Attorney, Agent, or Firm* — Lee & Morse, P.C.

(57) ABSTRACT

A composite cathode active material, a cathode and a lithium battery that include the composite cathode active material, and a method of preparing the composite cathode active material, the composite cathode active material including a compound having an olivine crystal structure; and an inorganic material, the inorganic material including at least one selected from the group of a metal carbonitride and a carbonitride.

22 Claims, 2 Drawing Sheets

(56) References Cited

U.S. PATENT DOCUMENTS

| | | |
|---|---|---|
| 2011/0020729 A1 | 1/2011 | Monden et al. |
| 2012/0049126 A1* | 3/2012 | Park et al. .................... 252/506 |
| 2012/0326079 A1* | 12/2012 | Kim et al. .................. 252/182.1 |
| 2013/0071753 A1* | 3/2013 | Kim et al. ................ 429/231.95 |
| 2014/0346410 A1* | 11/2014 | Lu et al. ........................ 252/506 |

FOREIGN PATENT DOCUMENTS

| | | |
|---|---|---|
| KR | 10-0814817 B1 | 3/2008 |
| WO | WO 2011037688 A1 * | 3/2011 |

OTHER PUBLICATIONS

Filipozzi, L., et al., "Local order and electrical properties of boron carbonitride films," Carbon, 1995, 33, 1747-1757.*

Lyth, S. M., et al., "Carbon nitride as a nonprecious catalyst for electrochemical oxygen reduction," J. Phys. Chem. C Lett., 2009, 113, 20148-20151.*

Pandolfo, A. G., et al., "Carbon properties and their role in supercapacitors," J. Power Sources, 2006, 157, 11-27.*

"Handbook of Mineralogy" entry for "lithiophilite," http://rruff.info/doclib/hom/lithiophilite.pdf. Downloaded on Oct. 28, 2014.*

\* cited by examiner

COMPOSITE CATHODE ACTIVE MATERIAL, CATHODE AND LITHIUM BATTERY THAT INCLUDE THE COMPOSITE CATHODE ACTIVE MATERIAL, AND METHOD OF PREPARING THE COMPOSITE CATHODE ACTIVE MATERIAL

BACKGROUND

1. Field

Embodiments relate to a composite cathode active material, a cathode and a lithium battery that include the composite cathode active material, and a method of preparing the composite cathode active material.

2. Description of the Related Art

With the trend toward small, high-performance devices, manufacturing of lithium batteries that are small, lightweight and have high energy densities has been considered. For application in electric vehicles, cycle characteristics of lithium batteries at room temperature and high-temperatures may be an important concern. The functionality of lithium batteries as a power storage device is becoming more important.

To implement a lithium battery for these uses, a variety of cathode active materials has been considered.

A cathode active material with an olivine crystal structure, which is a phosphorus oxide, may exhibit better stability at high temperatures, as compared with $LiCoO_2$.

SUMMARY

Embodiments are directed to a composite cathode active material, and a cathode and a lithium battery that include the composite cathode active material, and a method of preparing the composite cathode active material.

The embodiments may be realized by providing a composite cathode active material including a compound having an olivine crystal structure; and an inorganic material, the inorganic material including at least one selected from the group of a metal carbonitride and a carbonitride.

The inorganic material may include the metal carbonitride, the metal carbonitride being represented by Formula 1, below:

$$M''_b C_{1-a} N_a \quad \text{[Formula 1]}$$

wherein, in Formula 1, $0<a<1$, $0<b<1$, and M" includes at least one metal or metalloid selected from the group of Group 2 to Group 14 elements in the periodic table of elements.

M" may include at least one element selected from the group of titanium, calcium, magnesium, zinc, nickel, cobalt, aluminum, zirconium, iron, copper, boron, tantalum, niobium, vanadium, tungsten, molybdenum, silicon, uranium, and thorium.

The inorganic material may include the metal carbonitride, the metal carbonitride including at least one selected from the group of titanium carbonitride, calcium carbonitride, magnesium carbonitride, molybdenum carbonitride, zinc carbonitride, nickel carbonitride, cobalt carbonitride, aluminum carbonitride, zirconium carbonitride, iron carbonitride, copper carbonitride, and boron carbonitride.

The inorganic material may include the carbonitride, the carbonitride being represented by Formula 2 below:

$$C_{1-a} N_a \quad \text{[Formula 2]}$$

wherein, in Formula 2, $0<a<1$.

The inorganic material may include the carbonitride, the carbonitride including at least one selected from the group of $C_3N_4$, CN, and $C_3N$.

The compound having the olivine crystal structure may be represented by Formula 3, below:

$$Li_x Me_y M_z PO_{4-d} X_d \quad \text{[Formula 3]}$$

wherein, in Formula 3, $0.6 \le x \le 1.4$, $0<y \le 1$, $0 \le z<1$, and $0 \le d \le 0.2$; Me includes at least one selected from the group of iron, manganese, nickel, and cobalt; M includes at least one selected from the group of magnesium, calcium, copper, neodymium, strontium, barium, titanium, zirconium, niobium, molybdenum, tungsten, zinc, aluminum, and silicon; and X includes at least one selected from the group of sulfur and fluorine.

The compound having the olivine crystal structure may be represented by Formula 4, below:

$$Li_x Mn_{1-z} M'_z PO_{4-d} X_d \quad \text{[Formula 4]}$$

wherein, in Formula 4, $0.6 \le x \le 1.4$, $0 \le z<1$, and $0 \le d \le 0.2$; M' includes at least one selected from the group of Fe, Ni, Co, Mg, Ca, Cu, Nd, Sr, Ba, Ti, Zr, Nb, Mo, W, Zn, Al, and Si; and X includes at least one selected from the group of sulfur and fluorine.

The compound with the olivine crystal structure may include at least one selected from the group of $LiFePO_4$, $LiFe_{1-a}Mn_aPO_4$ ($0<a<1$), and $LiMnPO_4$.

The inorganic material may be in the form of one selected from the group of a nanoparticle, a nanofiber, a nanomesh, and a nanotube.

The inorganic material may have a Mohs hardness that is greater than a Mohs hardness of the compound with the olivine crystal structure.

The inorganic material may have a Mohs hardness of about 1 or greater.

The inorganic material may have an electrical conductivity higher than that of amorphous carbon.

The inorganic material may have an electrical conductivity of about 10 S/cm or greater.

The composite cathode active material may be represented by Formula 5 or Formula 6, below:

$$(1-r)Li_x Me_y M_z PO_{4-d} X_d \cdot r M''_b C_{1-a} N_a \quad \text{[Formula 5]}$$

$$(1-r)Li_x Me_y M_z PO_{4-d} X_d \cdot r C_{1-a} N_a \quad \text{[Formula 6]}$$

wherein, in Formulae 5 and 6, $0.6 \le x \le 1.4$, $0<y \le 1$, $0 \le z<1$, $0 \le d \le 0.2$, $0<r<1$, $0<a<1$, and $0<b<1$; Me includes at least one selected from the group of iron, manganese, nickel, and cobalt; M includes at least one selected from the group of magnesium, calcium, copper, neodymium, strontium, barium, titanium, zirconium, niobium, molybdenum, tungsten, zinc, aluminum, and silicon; M" includes at least one selected from the group of titanium, calcium, magnesium, zinc, nickel, cobalt, aluminum, zirconium, iron, copper, boron, tantalum, niobium, vanadium, tungsten, molybdenum, silicon, uranium, and thorium; and X includes at least one selected from the group of sulfur and fluorine.

r may satisfy the relation: $0.0001<r \le 0.3$.

The composite cathode active material may be represented by Formula 7 or Formula 8, below:

$$(1-r)Li_x Mn_{1-z} M'_z PO_{4-d} X_d \cdot r M''_b C_{1-a} N_a \quad \text{[Formula 7]}$$

$$(1-r)Li_x Mn_{1-z} M'_z PO_{4-d} X_d \cdot r C_{1-a} N_a \quad \text{[Formula 8]}$$

wherein, in Formulae 7 and 8, $0.6 \le x \le 1.4$, $0 \le z \le 0.2$, $0 \le d \le 0.2$, $0<r<1$, $0<a<1$, and $0<b<1$; M' includes at least one selected from the group of Fe, Ni, Co, Mg, Ca, Cu, Nd, Sr, Ba, Ti, Zr, Nb, Mo, W, Zn, Al, and Si; X includes at least one selected from the group of sulfur and fluorine; and M" includes at least one selected from the group of titanium, calcium, magnesium, zinc, nickel, cobalt, aluminum, zirconium, iron, copper, boron, tantalum, niobium, vanadium, tungsten, molybdenum, silicon, uranium, and thorium.

r may satisfy the relation: $0.0001 < r \leq 0.3$.

The composite cathode active material may further include a carbonaceous material.

The carbonaceous material may be included in an amount of about 0.1 wt % to about 30 wt %, based on a total weight of the composite cathode active material.

The embodiments may also be realized by providing a cathode comprising the composite cathode active material according to an embodiment.

The embodiments may also be realized by providing a lithium battery comprising the cathode according to an embodiment.

The embodiments may also be realized by providing a method of preparing a composite cathode active material, the method including sintering a mixture of a precursor of a compound with an olivine crystal structure and an inorganic material under an inert atmosphere, wherein the inorganic material includes at least one selected from the group of a metal carbonitride and a carbonitride.

The precursor of the compound with the olivine crystal structure may include a lithium precursor, a phosphate precursor, and a transition metal precursor.

The sintering may be performed at a temperature of about 400° C. to about 900° C. under an inert gas atmosphere for about 2 hours to about 48 hours.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
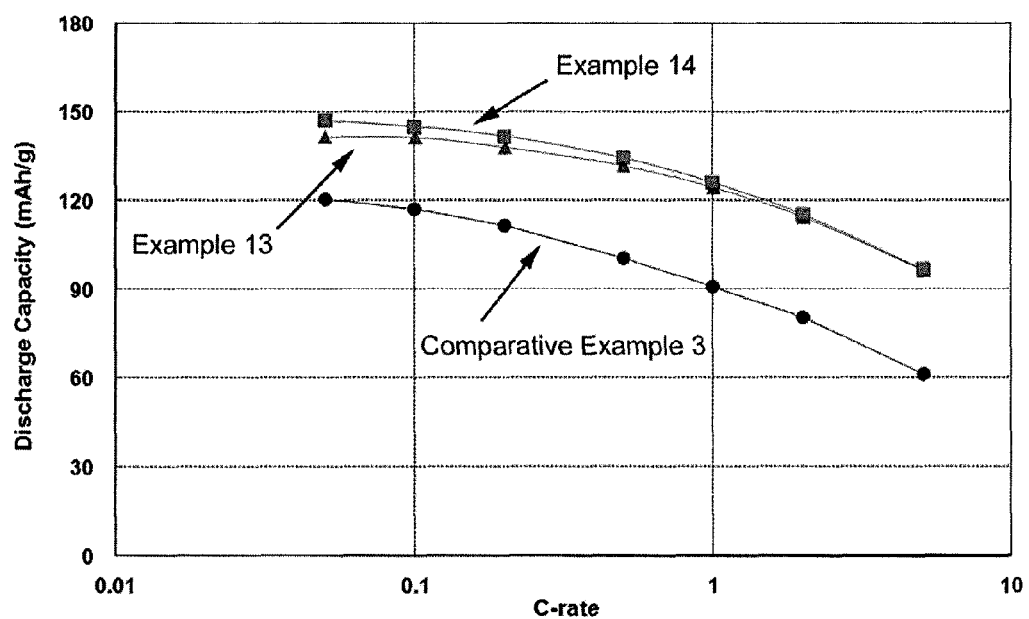
FIG. 1 illustrates a graph of results of a charge/discharge test on lithium batteries manufactured in Examples 13-14 and Comparative Example 3.

Korean Patent Application No. 10-2011-0115923, filed on Nov. 8, 2011, in the Korean Intellectual Property Office, and entitled: "Composite Cathode Active Material, Cathode and Lithium Battery that Include the Composite Cathode Active Material, and Method of Preparing the Composite Cathode Active Material," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

As used herein, the term "and/or" includes any and all combinations of one or more of the associated listed items.

Expressions such as "at least one of," when preceding a list of elements, modify the entire list of elements and do not modify the individual elements of the list.

Hereinafter, one or more embodiments of a composite cathode active material, a cathode and a lithium battery (each including the composite active material), and a method of preparing the composite active material will be described in greater detail.

One or more embodiments include a composite cathode active material that includes a compound with an olivine crystal structure and an inorganic material. In an implementation, the inorganic material may include at least one selected from the group of a metal carbonitride and a carbonitride.

The inorganic material of the composite cathode active material, e.g., a thermally and chemically stable metal carbonitride and/or carbonitride, may serve as a dispersant in preparing the composite cathode active material. This may help improve dispersibility of the compound with the olivine crystal structure, and consequently may help improve electrical conductivity of the composite cathode active material and high-rate properties of a lithium battery including the composite cathode active material.

In an implementation, the metal carbonitride may be represented by Formula 1, below.

$$M''_b C_{1-a} N_a \qquad \text{[Formula 1]}$$

In Formula 1, a and b may satisfy the following relations: $0 < a < 1$, and $0 < b < 1$. M'' may include at least one metal or metalloid selected from the group of Group 2 to Group 14 elements in the periodic table of elements.

For example, M'' may include at least one element selected from the group of titanium (Ti), calcium (Ca), magnesium (Mg), zinc (Zn), nickel (Ni), cobalt (Co), aluminum (Al), zirconium (Zr), iron (Fe), copper (Cu), boron (B), tantalum (Ta), niobium (Nb), vanadium (V), tungsten (W), molybdenum (Mo), silicon (Si), uranium (U), and thorium (Th).

For example, the metal carbonitride may include at least one selected from the group of titanium carbonitride, calcium carbonitride, magnesium carbonitride, molybdenum carbonitride, zinc carbonitride, nickel carbonitride, cobalt carbonitride, aluminum carbonitride, zirconium carbonitride, iron carbonitride, copper carbonitride, and boron carbonitride.

In an implementation, the carbonitride may be represented by Formula 2, below.

$$C_{1-a} N_a \qquad \text{[Formula 2]}$$

In Formula 2, a may satisfy the following relation: $0 < a < 1$. For example, the carbonitride may include at least one selected from the group of $C_3N_4$, CN, and $C_3N$.

The compound with the olivine crystal structure may have an electrical conductivity of less than about $10^{-7}$ S/cm. For example, $LiFePO_4$ and $LiMnPO_4$ have a conductivity of about $10^{-9}$ S/cm and about $10^{-10}$ S/cm, respectively. Accordingly, the inorganic material may be added to help improve the electrical conductivity of the composite cathode active material. The inorganic material may help improve the electrical conductivity of the compound having the olivine crystal structure, by being dispersed in the composite cathode active material.

In an implementation, the compound with the olivine crystal structure of the composite cathode active material may be represented by Formula 3, below.

$$Li_x Me_y M_z PO_{4-d} X_d \qquad \text{[Formula 3]}$$

In Formula 3, x, y, z, and d may satisfy the following relations: $0.6 \leq x \leq 1.4$, $0 < y \leq 1$, $0 \leq z < 1$, and $0 \leq d \leq 0.2$. Me may include at least one selected from the group of iron (Fe), manganese (Mn), nickel (Ni), and cobalt (Co). M may include at least one selected from the group of magnesium (Mg), calcium (Ca), copper (Cu), neodymium (Nd), strontium (Sr), barium (Ba), titanium (Ti), zirconium (Zr), niobium (Nb), molybdenum (Mo), tungsten (W), zinc (Zn), aluminum (Al), and silicon (Si); and X may include at least one selected from the group of sulfur (S) and fluorine (F).

In an implementation, the compound with the olivine crystal structure may be represented by Formula 4, below.

$$Li_xMn_{1-z}M'_zPO_{4-d}X_d \quad \text{[Formula 4]}$$

In Formula 4, x, z, and d may satisfy the following relations: $0.6 \leq x \leq 1.4$, $0 \leq z < 1$, and $0 \leq d \leq 0.2$. M' may include at least one selected from the group of Fe, Ni, Co, Mg, Ca, Cu, Nd, Sr, Ba, Ti, Zr, Nb, Mo, W, Zn, Al, and Is. X may include at least one selected from the group of S and F.

In an implementation, the compound with the olivine crystal structure may include at least one selected from the group of $LiFePO_4$, $LiFe_{1-a}Mn_aPO_4$ ($0 < a < 1$), and $LiMnPO_4$.

In an implementation, the inorganic material of the composite cathode active material may be in the form of at least one selected from the group of a nanoparticle, a nanofiber, a nanomesh, and a nanotube.

In an implementation, the inorganic material of the composite cathode active material may have a nano size. The inorganic material may be in the form of nanoparticles having an average diameter from about 10 nm to about 500 nm. In an implementation, the inorganic material may be in the form of microparticles having an average diameter of about 1 μm or greater.

The inorganic material of the composite cathode active material may have a Mohs hardness greater than a Mohs hardness of the compound with the olivine crystal structure. Accordingly, the inorganic material may be able to disperse the compound with the olivine crystal structure.

In an implementation, the inorganic material of the composite cathode active material may have a Mohs hardness of about 1 or greater. For example, the inorganic material may have a Mohs hardness of about 1 to about 10. Maintaining the Mohs hardness of the inorganic material at about 1 or greater may help improve charge/discharge characteristics of a lithium battery. For example, the inorganic material (with a Mohs hardness of about 1 or greater) may include titanium carbonitride.

The inorganic material may have an electrical conductivity higher than that of amorphous carbon. Although it has a higher electrical conductivity than amorphous carbon (that is a common carbonaceous material), the inorganic material may improve the dispersiblity of the compound with the olivine crystal structure, and thus may help improve the electrical conductivity of the composite cathode active material and the charge/discharge characteristics of a lithium battery using the same.

In an implementation, the inorganic material of the composite cathode active material may have an electrical conductivity of about 10 S/cm or greater. In an implementation, the inorganic material may have an electrical conductivity of about $10^2$ S/cm or greater, e.g., about $10^2$ S/cm to about $10^9$ S/cm. For example, the inorganic material may include titanium carbonitride.

The inorganic material may be included in the composite cathode active material in an amount of about 20 wt % or less, based on a total weight of the composite cathode active material. In an implementation, the inorganic material may be included in an amount of about 10 wt % or less, based on the total weight of the composite cathode active material. In an implementation, the inorganic material may be included in an amount of about 0.01 wt % to about 10 wt %, based on the total weight of the composite cathode active material. In an implementation, the inorganic material may be included in an amount of about 0.05 wt % to about 10 wt %, based on the total weight of the composite cathode active material. In an implementation, the inorganic material may be included in an amount of about 0.1 wt % to about 10 wt %, based on the total weight of the composite cathode active material. In an implementation, the inorganic material may be included in an amount of about 0.1 wt % to about 5 wt %, based on the total weight of the composite cathode active material. In an implementation, the inorganic material may be included in an amount of about 0.1 wt % to about 2 wt %, based on the total weight of the composite cathode active material.

The composite cathode active material, e.g., a composite of the compound with the olivine crystal structure and the inorganic material, may include a compound represented by Formula 5 or Formula 6, below.

$$(1-r)Li_xMe_yM_zPO_{4-d}X_d-rM''_bC_{1-a}N_a \quad \text{[Formula 5]}$$

$$(1-r)Li_xMe_yM_zPO_{4-d}X_d-rC_{1-a}N_a \quad \text{[Formula 6]}$$

In Formulae 5 and 6, x, y, z, d, r, a, and b may satisfy the flowing relations: $0.6 \leq x \leq 1.4$, $0 < y \leq 1.1$, $0 \leq z \leq 1$, $1.6 \leq x+y+z \leq 2.2$, and $0 \leq d \leq 0.2$, $0 < r < 1$, $0 < a < 1$, and $0 < b < 1$. Me may include at least one selected from the group of iron (Fe), manganese (Mn), nickel (Ni), and cobalt (Co); M may include at least one selected from the group of magnesium (Mg), calcium (Ca), copper (Cu), neodymium (Nd), strontium (Sr), barium (Ba), titanium (Ti), zirconium (Zr), niobium (Nb), molybdenum (Mo), tungsten (W), zinc (Zn), aluminum (Al), and silicon (Si). M'' may include at least one selected from the group of Ti, Ca, Mg, Zn, Ni, Co, Al, Zr, Fe, Cu, B, Ta, Nb, V, W, Mo, Si, U, and Th. X may include at least one selected from the group of sulfur (S) and fluorine (F).

In an implementation, in the composite cathode active materials of Formulae 5 and 6, r may satisfy the relation: $0.0001 < r \leq 0.3$. In an implementation, in the composite cathode active materials of Formulae 5 and 6, r may satisfy the relation: $0.001 < r \leq 0.3$. In an implementation, in the composite cathode active materials of Formulae 5 and 6, r may satisfy the relation: $0.001 < r \leq 0.1$. For example, the inorganic material may be included in the composite cathode active material in an amount of about 0.01 mole % to about 30 mole %.

In an implementation, the composite cathode active material may be represented by Formula 7 or 8, below.

$$(1-r)Li_xMn_{1-z}M'_zPO_{4-d}X_d-rM''C_{1-a}N_a \quad \text{[Formula 7]}$$

$$(1-r)Li_xMn_{1-z}M'_zPO_{4-d}X_d-rC_{1-a}N_a \quad \text{[Formula 8]}$$

In Formulae 7 and 8, x, z, d, r, and a may satisfy the following relations: $0.6 \leq x \leq 1.4$, $0 \leq z \leq 0.2$, $0 \leq d \leq 0.2$, $0 < r < 1$, and $0 < a < 1$. M' may include at least one selected from the group of Fe, Ni, Co, Mg, Ca, Cu, Nd, Sr, Ba, Ti, Zr, Nb, Mo, W, Zn, Al, and Is. X may include at least one selected from the group of S and F. M'' may include at least one selected from the group of Ti, Ca, Mg, Zn, Ni, Co, Al, Zr, Fe, Cu, B, Ta, Nb, V, W, Mo, Si, U, and Th.

In an implementation, in the composite cathode active materials of Formulae 7 and 8, r may satisfy the relation: $0.00001 < r \leq 0.3$. In an implementation, in the composite cathode active materials of Formulae 7 and 8, r may satisfy the relation: $0.001 < r \leq 0.3$. In an implementation, in the composite cathode active materials of Formulae 7 and 8, r may satisfy the relation: $0.01 < r \leq 0.1$. The inorganic material may be included in the composite cathode active material in an amount of about 0.01 mole % to about 30 mole %.

Non-limiting examples of the composite cathode active material may include $(1-r)LiMn_{1-z}Fe_zPO_{4-d}X_d-rTiCN$ ($0 \leq z \leq 0.2$, $0 \leq d \leq 0.2$, $0 < r < 1$), and $(1-r)LiMn_{1-z}Fe_zPO_{4-d}X_d-rC_3N_4$ ($0 \leq z \leq 0.2$, $0 \leq d \leq 0.2$, $0 < r < 1$).

A metal, e.g., transition metal, in the compound with the olivine crystal structure may partially form a chemical bond with the inorganic material in the composite cathode active material. The chemical bond may partially change the structure of the compound with the olivine crystal structure, thereby improving the electrical conductivity of the composite cathode active material.

The inorganic material in the composite cathode active material may be partially coated on a surface of the compound with the olivine crystal structure. For example, the composite cathode active material may have a structure with a coating layer of the inorganic material on part of a surface of the compound with the olivine crystal structure serving as a core.

In an implementation, the composite cathode active material may have a structure in which the inorganic material is dispersed.

The composite cathode active material may further include a carbonaceous material. The carbonaceous material may help further improve the electrical conductivity of the composite cathode active material. The carbonaceous material may include at least one selected from the group of graphite, carbon black, amorphous carbon, fibrous carbon, and a combination thereof. Any suitable carbonaceous material that is capable of improving the conductivity of the composite cathode active material may be used.

The carbonaceous material may be included in the composite cathode active material in an amount of about 0.1 wt % to about 30 wt %, based on the total weight of the composite cathode active material. In an implementation, the amount of the carbonaceous material may be appropriately adjusted within a range to improve the electrical conductivity of the composite cathode active material. In an implementation, the carbonaceous material may be included in an amount of about 1 wt % to about 20 wt %, based on the total weight of the composite cathode active material. In an implementation, the carbonaceous material may be included in an amount of about 1 wt % to about 10 wt %, based on the total weight of the composite cathode active material.

An embodiment provides a cathode including the composite cathode active material.

The cathode may be manufactured as follows. First, the above-described composite cathode active material, a conducting agent, a binder, and a solvent may be mixed to prepare a cathode active material composition. The cathode active material composition may be directly coated on an aluminum current collector and dried to form a cathode active film on a cathode plate. Alternatively, the cathode active material composition may be cast on a separate support to form a cathode active material film, which is then separated from the support and laminated on an aluminum current collector to prepare a cathode plate with the cathode active material film.

Non-limiting examples of the conducting agent may include carbon black, graphite particulates, natural graphite, artificial graphite, acetylene black, Ketjen black, carbon fibers, metallic materials, such as copper, nickel, aluminum, silver, and the like, in powder, fiber, or tube form, and a conductive polymer such as polyphenylene derivatives. Any suitable conducting agent may be used.

Non-limiting examples of the binder may include a vinylidene fluoride/hexafluoropropylene copolymer, polyvinylidene fluoride (PVDF), polyacrylonitrile, polymethyl-methacrylate, polytetrafluoroethylene, mixtures thereof, and a styrene butadiene rubber polymer. Non-limiting examples of the solvent may include N-methyl-pyrrolidone (NMP), acetone, and water. Any suitable material available for these purposes may be used.

In an implementation, a plasticizer may be further added into the cathode active material composition to form a cathode plate with pores.

Amounts of the composite cathode active material, the conducting agent, the binder, and the solvent may correspond with those generally used in the manufacture of a lithium battery. At least one of the conducting agent, the binder, and the solvent may be omitted, according to a use and a structure of the lithium battery.

In an implementation, the cathode may further include a common cathode active material, in addition to the composite cathode active material.

The common cathode active material may include any suitable common cathode active material, e.g., a lithium-containing metal oxide. In an implementation, the cathode active material may include at least one composite oxide of lithium and a metal selected from among cobalt (Co), manganese (Mn), nickel (Ni), and a combination thereof. For example, the cathode active material may include a compound selected from the group of $Li_aA_{1-b}B_bD_2$ (where $0.90 \leq a \leq 1.8$, and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A may be selected from the group of nickel (Ni), cobalt (Co), manganese (Mn), and combinations thereof; B may be selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from the group of oxygen (O), fluorine (F), sulfur (S), phosphorus (P), and combinations thereof; E may be selected from the group of cobalt (Co), manganese (Mn), and combinations thereof; F may be selected from the group of fluorine (F), sulfur (S), phosphorus (P), and combinations thereof; G may be selected from the group of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I may be selected from the group of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

Non-limiting examples of the common cathode active material may include $LiCoO_2$, $LiMn_xO_{2x}$ (x=1, 2), $LiNi_{1-x}Mn_xO_{2x}$ (0<x<1), $Ni_{1-x-y}Co_xMn_yO_2$ (0≤x≤0.5, 0≤y≤0.5), and $LiFePO_4$.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from the group of oxide, hydroxide, oxyhydroxide, oxycarbonate, and hydroxycarbonate of the coating element. The compounds for the coating layer may be amorphous or crystalline. The coating element for the coating layer may include, e.g., magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any suitable method that does not adversely affect the physical properties of the cathode active material when a compound of the coating element is used. For example, the coating layer may be formed using a spray coating method, a dipping method, or the like.

The embodiments provide a lithium battery including the cathode containing the composite cathode active material. The lithium battery may be manufactured in the following manner.

First, a cathode may be prepared according to the above-described cathode formation method.

Next, an anode may be manufactured as follows. The anode may be manufactured in the same manner as the cathode, except for using an anode active material instead of the composite cathode active material. A conducting agent, a binder, and a solvent used to prepare an anode active material composition may be the same as those used in the cathode active material composition.

For example, an anode active material, a conducting agent, a binder, and a solvent may be mixed to prepare an anode active material composition, which may then be directly coated on a copper current collector, thereby manufacturing an anode plate. Alternatively, the anode active material composition may be cast on a separate support, and then an anode active material film separated from the support may be laminated on a copper current collector to prepare an anode plate.

The anode active material may include any suitable anode active material for a lithium battery. For example, the anode active material may include at least one selected from the group of lithium metal, a metal that is alloyable with lithium, a transition metal oxide, a non-transition metal oxide, and a carbonaceous material.

Non-limiting examples of the metal alloyable with lithium may include Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). Y may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Non-limiting examples of the transition metal oxide may include a lithium titanium oxide, a vanadium oxide, and a lithium vanadium oxide.

Non-limiting examples of the non-transition metal oxide may include $SnO_2$ and $SiO_x$ (0<x<2).

Non-limiting examples of the carbonaceous material may include crystalline carbon, amorphous carbon, and mixtures thereof. Non-limiting examples of the crystalline carbon may include graphite, such as natural graphite or artificial graphite that are in amorphous, plate, flake, spherical or fibrous form. Non-limiting examples of the amorphous carbon may include soft carbon (carbon sintered at low temperatures), hard carbon, meso-phase pitch carbides, sintered corks, and the like.

Amounts of the cathode electrode active material, the conducting agent, the binder, and the solvent may correspond to levels that are generally used in the manufacture of a lithium battery.

Next, a separator (to be disposed between the cathode and the anode) may be prepared. The separator for the lithium battery may include any suitable separator that is commonly used in lithium batteries. The separator may have low resistance to migration of ions in an electrolyte and may have an excellent electrolyte-retaining ability. Non-limiting examples of materials for forming the separator may include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may include any suitable material that is commonly used as a binder for electrode plates. Non-limiting examples of the polymer resin may include a vinylidenefluoride/hexafluoropropylene copolymer, polyvinylidene fluoride (PVDF), polyacrylonitrile, polymethylmethacrylate and a mixture thereof.

Next, an electrolyte may be prepared.

For example, the electrolyte may include an organic electrolyte solution. Alternately, the electrolyte may be in a solid phase. Non-limiting examples of the electrolyte may include lithium oxide and lithium oxynitride. Any suitable material available as a solid electrolyte may be used. The solid electrolyte may be formed on the anode by, e.g., sputtering.

In an implementation, an organic electrolyte solution may be prepared as follows. The organic electrolyte solution may be prepared by dissolving a lithium salt in an organic solvent.

The organic solvent may include any suitable organic solvent. Non-limiting examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may include any suitable lithium salt. Non-limiting examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI and a mixture thereof.

Figure 2:
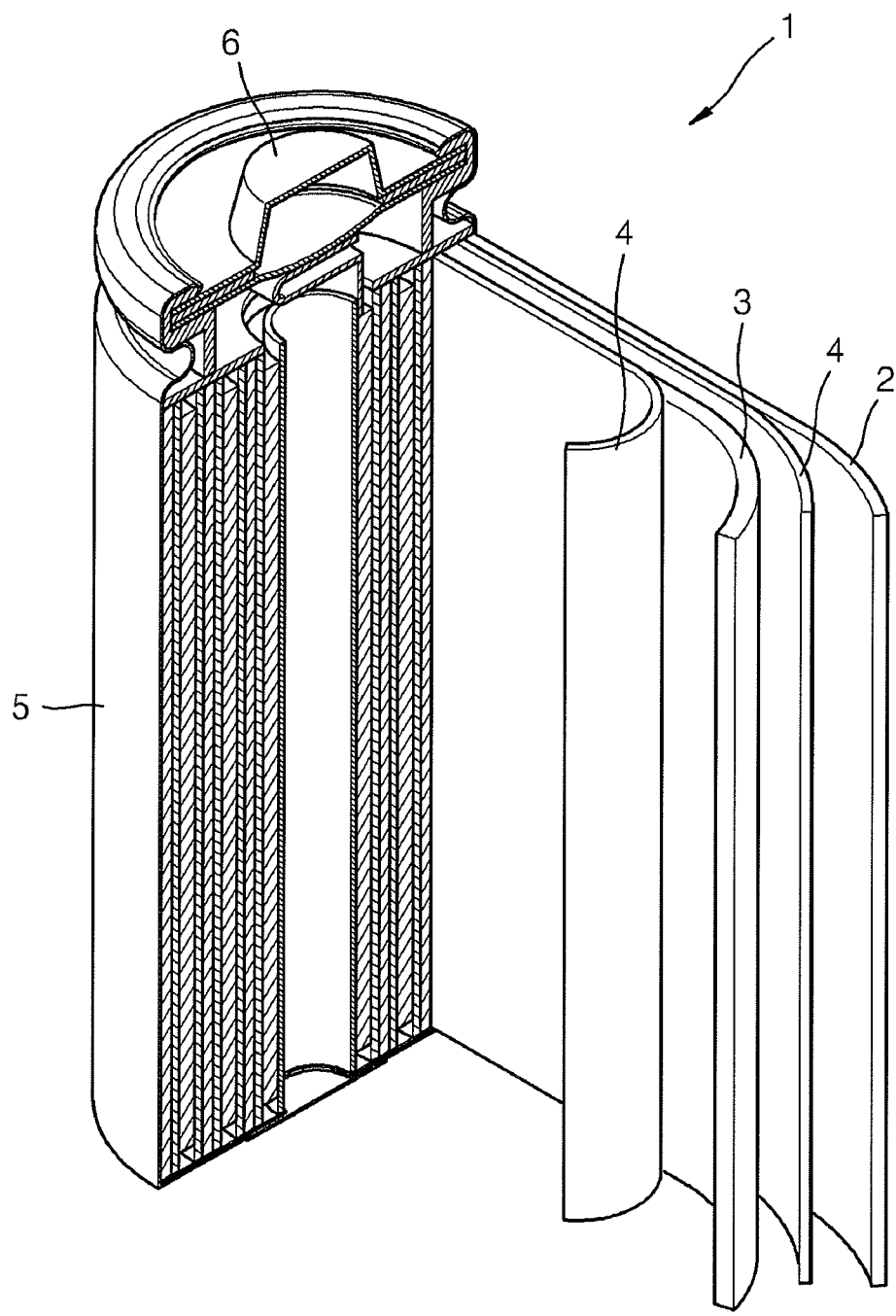
FIG. 2 illustrates a schematic view of a lithium battery according to an embodiment.

Referring to FIG. 2, a lithium battery 1 may include a cathode 3, an anode 2, and a separator 4. The cathode 3, the anode 2, and the separator 4 may be wound or folded, and then sealed in a battery case 5. Then, the battery case 5 may be filled with an organic electrolyte solution and sealed with a cap assembly 6, thereby completing manufacture of the lithium battery 1. The battery case 5 may be a cylindrical type, a rectangular type, or a thin-film type. For example, the lithium battery may be a thin-film type battery. The lithium battery may be a lithium ion battery.

The separator may be interposed between the cathode and the anode to form a battery or electrode assembly. Alternatively, the battery or electrode assembly may be stacked in a bi-cell structure and impregnated with the electrolyte solution. The resultant may be put into a pouch and hermetically sealed, thereby completing manufacture of a lithium ion polymer battery.

Alternatively, a plurality of battery assemblies or batteries may be stacked to form a battery pack, which may be used in any device that operates at high temperatures and requires high output, e.g., in a laptop computer, a smart phone, electric vehicle, and the like.

The lithium battery may have high discharge capacity and improved high rate characteristics, and thus may be applicable in an electric vehicle (EV), e.g., in a hybrid vehicle or a plug-in hybrid electric vehicle (PHEV). The lithium battery may be applicable to a high-power storage field, e.g., in an electric bicycle, a power tool, or the like.

An embodiment provides a method of preparing a composite cathode active material. The method may include sintering a mixture of a precursor of a compound with an olivine crystal structure and an inorganic material under an inert atmosphere. The inorganic material may include at least one selected from the group of a metal carbonitride and a carbonitride.

In the method of preparing the composite cathode active material, the precursor of the compound with the olivine crystal structure may include a lithium precursor, a phosphate ($PO_4$) precursor, and a transition metal precursor.

In an implementation, the lithium precursor may include at least one selected from the group of lithium carbonate ($Li_2CO_3$), lithium nitrate ($LiNO_3$), lithium acetate ($LiCH_3COO$), lithium sulfide (LiS), lithium iodide (LiI), and lithium hydroxide (LiOH). Any suitable material available as a lithium precursor may be used.

In an implementation, the phosphate ($PO_4$) precursor may include, e.g., $NH_4H_2PO_4$, $H_3PO_4$, or the like. Any suitable material available as a phosphate precursor may be used.

In an implementation, the transition metal precursor may include at least one selected from the group of manganese carbonate ($MnCO_3$), magnesium nitrate ($Mg(NO_3)_2$), iron oxalate ($FeC_2O_4$), iron acetate ($Fe(CH_3COO)_2$), iron acetylacetonate ($Fe(C_5H_7O_2)_2$), manganese acetate ($Mn(CH_3COO)_2$), iron sulfate ($FeSO_4$), iron chloride ($Fe(Cl)_2$), iron citrate ($FeC_6H_5O_7$), and iron perchlorate ($Fe(ClO_4)_2$). Any suitable material available as a transition metal precursor may be used.

The inorganic material used in the preparing of the composite cathode active material may have a Mohs hardness of about 1 or greater. For example, the inorganic material may have a Mohs hardness of about 1 to about 10. The inorganic material having a Mohs hardness of about 1 or greater may help improve the charge/discharge characteristics of a lithium battery.

The inorganic material used in the preparing of the composite cathode active material may include or serve as an electrical conductor. The electrical conductor may have an electrical conductivity of about 10 S/cm or greater. In an implementation, the electrical conductor may have an electrical conductivity from about 10 to about $10^9$ S/cm.

The inorganic material used in the preparing of the composite cathode active material may include a metal carbonitride and/or a carbonitride.

In an implementation, the inorganic material may include a compound represented by Formula 1, below.

$$M''_b C_{1-a} N_a \quad [\text{Formula 1}]$$

In Formula 1, 0<a<1, 0<b<1; and M'' may include at least one metal or metalloid selected from the group of Group 2 to Group 14 elements in the periodic table of elements.

For example, M'' may include at least one element selected from the group of Ti, Ca, Mg, Zn, Ni, Co, Al, Zr, Fe, Cu, B, Ta, Nb, V, W, Mo, Si, U, and Th.

For example, the inorganic material may include at least one selected from the group of titanium carbonitride, calcium carbonitride, magnesium carbonitride, molybdenum carbonitride, zinc carbonitride, nickel carbonitride, cobalt carbonitride, aluminum carbonitride, zirconium carbonitride, iron carbonitride, copper carbonitride, and boron carbonitride.

In an implementation, the inorganic material may include a carbonitride represented by Formula 2, below.

$$C_{1-a}N_a \quad [\text{Formula 2}]$$

In Formula 2, 0<a<1.

In an implementation, the inorganic material may include at least one selected from the group of $C_3N_4$, CN, and $C_3N$.

In the method of preparing the composite cathode active material, the sintering may be performed at a temperature of about 400° C. to about 900° C. under an inert atmosphere for about 2 to about 48 hours. The temperature and time may be appropriately adjusted within a range in order to help improve the electric conductivity of the composite cathode active material. In an implementation, the sintering may be performed at about 400° C. to about 900° C. In an implementation, the sintering may be performed at about 500° C. to about 700° C. In an implementation, the sintering may be performed for about 2 to about 48 hours. In an implementation, the sintering may be performed for about 5 to about 10 hours.

The inert atmosphere is not specifically limited. In an implementation, the inert atmosphere may include an inert gas, e.g., nitrogen, argon, or neon.

The mixture used in preparing the composite cathode active material may further include a carbonaceous material. The carbonaceous material may help further improve the electrical conductivity of the composite cathode active material.

The carbonaceous material may include at least one selected from the group of graphite, carbon black, amorphous carbon, fibrous carbon, and a combination thereof. Any suitable carbonaceous material capable of improving the conductivity of the composite cathode active material may be used.

The carbonaceous material may include a carbon precursor capable of forming a carbonaceous material by sintering. Non-limiting examples of the carbon precursor capable of forming a carbonaceous material by sintering may include a polymer, sugar alcohol, and sucrose.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Preparation of Composite Cathode Active Material

Example 1

$Li_2CO_3$, $MnCO_3$, $FeC_2O_4$, and $NH_4H_2PO_4$ were mixed together in a mole ratio of 0.5:0.9:0.1:1.0, and 4.8 wt % of carbon powder (Ketjen Black 600JD) and 0.2 wt % of titanium carbonitride (TiCN) were added to the mixture, based on a total weight of the mixture. Then, the mixture was sintered under an inert atmosphere (nitrogen atmosphere) at about 600° C. for about 6 hours to prepare the composite cathode active material. The composite cathode active material included a compound with an olivine crystal structure represented by $LiMn_{0.9}Fe_{0.1}PO_4$.

Example 2

$Li_2CO_3$, $MnCO_3$, $FeC_2O_4$, and $NH_4H_2PO_4$ were mixed together in a mole ratio of 0.5:0.9:0.1:1.0, and 4.6 wt % of carbon powder (Ketjen Black 600JD) and 0.4 wt % of titanium carbonitride (TiCN) were added to the mixture, based on the total weight of the mixture. Then, the mixture was sintered under an inert atmosphere (nitrogen atmosphere) at about 600° C. for about 6 hours to prepare the composite cathode active material.

Example 3

$Li_2CO_3$, $MnCO_3$, $FeC_2O_4$, and $NH_4H_2PO_4$ were mixed in a mole ratio of 0.5:0.9:0.1:1.0, and 4.0 wt % of carbon powder (Ketjen Black 600JD) and 1.0 wt % of titanium carbonitride (TiCN) were added to the mixture, based on the total weight of the mixture. Then, the mixture was sintered under an inert atmosphere (nitrogen atmosphere) at about 600° C. for about 6 hours to prepare the composite cathode active material.

Example 4

$Li_2CO_3$, $FeC_2O_4$, and $NH_4H_2PO_4$ were mixed in a mole ratio of 0.5:1.0:1.0, and 4.8 wt % of carbon powder (Ketjen Black 600JD) and 0.2 wt % of titanium carbonitride (TiCN) were added to the mixture, based on the total weight of the mixture. Then, the mixture was sintered under an inert atmosphere (nitrogen atmosphere) at about 600° C. for about 6 hours to prepare the composite cathode active material. The composite cathode active material included a compound with an olivine crystal structure represented by $LiFePO_4$.

Example 5

$Li_2CO_3$, $FeC_2O_4$, and $NH_4H_2PO_4$ were mixed together in a mole ratio of 0.5:1.0:1.0, and 4.6 wt % of carbon powder (Ketjen Black 600JD) and 0.4 wt % of titanium carbonitride (TiCN) were added to the mixture, based on the total weight of the mixture. Then, the mixture was sintered under an inert atmosphere (nitrogen atmosphere) at about 600° C. for about 6 hours to prepare the composite cathode active material.

Example 6

$Li_2CO_3$, $FeC_2O_4$, and $NH_4H_2PO_4$ were mixed in a mole ratio of 0.5:1.0:1.0, and 4.0 wt % of carbon powder (Ketjen Black 600JD) and 1.0 wt % of titanium carbonitride (TiCN) were added to the mixture, based on the total weight of the mixture. Then, the mixture was sintered under an inert atmosphere (nitrogen atmosphere) at about 600° C. for about 6 hours to prepare the composite cathode active material.

Example 7

$Li_2CO_3$, $MnCO_3$, $FeC_2O_4$, and $NH_4H_2PO_4$ were mixed together in a mole ratio of 0.5:0.9:0.1:1.0, and 4.8 wt % of carbon powder (Ketjen Black 600JD) and 0.2 wt % of titanium carbonitride (TiCN) were added to the mixture, based on the total weight of the mixture. Then, the mixture was sintered under an inert atmosphere (nitrogen atmosphere) at about 600° C. for about 6 hours to prepare the composite cathode active material. The composite cathode active material included the compound with an olivine crystal structure represented by $LiMn_{0.9}Fe_{0.1}PO_4$.

Example 8

$Li_2CO_3$, $MnCO_3$, $FeC_2O_4$, and $NH_4H_2PO_4$ were mixed together in a mole ratio of 0.5:0.9:0.1:1.0, and 4.6 wt % of carbon powder (Ketjen Black 600JD) and 0.46 wt % of titanium carbonitride (TiCN) were added to the mixture, based on the total weight of the mixture. Then, the mixture was sintered under an inert atmosphere (nitrogen atmosphere) at about 600° C. for about 6 hours to prepare the composite cathode active material.

Example 9

$Li_2CO_3$, $MnCO_3$, $FeC_2O_4$, and $NH_4H_2PO_4$ were mixed in a mole ratio of 0.5:0.9:0.1:1.0, and 4.0 wt % of carbon powder (Ketjen Black 600JD) and 1.0 wt % of carbonitride ($C_3N_4$) were added to the mixture, based on the total weight of the mixture. Then, the mixture was sintered under an inert atmosphere (nitrogen atmosphere) at about 600° C. for about 6 hours to prepare the composite cathode active material.

Example 10

$Li_2CO_3$, $FeC_2O_4$, and $NH_4H_2PO_4$ were mixed together in a mole ratio of 0.5:1.0:1.0, and 4.8 wt % of carbon powder (Ketjen Black 600JD) and 0.2 wt % of carbonitride ($C_3N_4$) were added to the mixture, based on the total weight of the mixture. Then, the mixture was sintered under an inert atmosphere (nitrogen atmosphere) at about 600° C. for about 6 hours to prepare a composite cathode active material. The composite cathode active material included a compound with an olivine crystal structure represented by $LiFePO_4$.

Example 11

$Li_2CO_3$, $FeC_2O_4$, and $NH_4H_2PO_4$ were mixed together in a mole ratio of 0.5:1.0:1.0, and 4.6 wt % of carbon powder (Ketjen Black 600JD) and 0.4 wt % of carbonitride ($C_3N_4$)

were added to the mixture, based on the total weight of the mixture. Then, the mixture was sintered under an inert atmosphere (nitrogen atmosphere) at about 600° C. for about 6 hours to prepare the composite cathode active material.

Example 12

$Li_2CO_3$, $FeC_2O_4$, and $NH_4H_2PO_4$ were mixed together in a mole ratio of 0.5:1.0:1.0, and 4.0 wt % of carbon powder (Ketjen Black 600JD) and 1.0 wt % of carbonitride ($C_3N_4$) were added to the mixture, based on the total weight of the mixture. Then, the mixture was sintered under an inert atmosphere (nitrogen atmosphere) at about 600° C. for about 6 hours to prepare the composite cathode active material.

Comparative Example 1

$Li_2CO_3$, $MnCO_3$, $FeC_2O_4$, and $NH_4H_2PO_4$ were mixed together in a mole ratio of 0.5:0.9:0.1:1.0, and 5.0 wt % of carbon powder (Ketjen Black 600JD) was added to the mixture, based on the total weight of the mixture. Then, the mixture was sintered under an inert atmosphere (nitrogen atmosphere) at about 600° C. for about 6 hours to prepare the composite cathode active material.

Comparative Example 2

$Li_2CO_3$, $FeC_2O_4$, and $NH_4H_2PO_4$ were mixed together in a mole ratio of 0.5:1.0:1.0, and 5.0 wt % of carbon powder (Ketjen Black 600JD) was added to the mixture, based on the total weight of the mixture. Then, the mixture was sintered under an inert atmosphere (nitrogen atmosphere) at about 600° C. for about 6 hours to prepare the composite cathode active material.

Manufacture of Cathode and Lithium Battery

Example 13

97 wt % of the composite cathode active material powder prepared in Example 1, 3 wt % of polyvinylidene fluoride (PVDF), and N-methylpyrrolidone (NMP) (in an amount such that a weight ratio of NMP:PVDF was about 10:1) were mixed together in an agate mortar to prepare a slurry. The slurry was coated on a 15 μm thick Al foil to a thickness of about 120 μm using a doctor blade. Then, the resultant was dried at about 80° C. for about 2 hours, and then dried again at about 110° C. in a vacuum for about 2 hours to manufacture a cathode plate.

The cathode plate, a lithium metal constituting a counter electrode, a polypropylene layer (Celgard 3501) constituting a separator, and an electrolyte solution obtained by preparing a 1 M solution of $LiPF_6$ in a mixed solvent of ethylene carbonate (EC) and diethylene carbonate (DEC) (volume ratio of 3:7) were used to manufacture a 2032 sized coin cell.

Examples 14-24

Cathodes and lithium batteries were manufactured in the same manner as in Example 13, except that the composite cathode active materials of Examples 2-12 were used, instead of the composite cathode active material of Example 1.

Comparative Examples 3-4

Cathodes and lithium batteries were manufactured in the same manner as in Example 7, except that the composite cathode active materials of Comparative Examples 1 and 2, instead of the composite cathode active material of Example 1, were used.

Evaluation Example 1

Transmission Electron Microscopic (TEM) Test

A surface of the cathode active material of Example 1 was observed using TEM. As a result, a carbonitride phase was observed, which indicated that the composite cathode active material included a carbonitride (e.g., TiCN).

Evaluation Example 2

Charge-Discharge Test at Room Temperature

The lithium batteries manufactured according to Examples 13 to 24 and Comparative Example 3 were charged by flowing a current of about 0.05 C (7.5 mA) per 1 g of the cathode active material until their voltage reached 4.5 V (with respect to Li), followed by constant voltage charging at a constant voltage of 4.5 V until the current reached 0.01 C, and then constant current discharging with an increasing current density until the voltage reached 2.0 V (with respect to Li) was performed. While the charge-discharge cycle was repeated, the current density for discharging was sequentially increased. The current density for each discharging were 0.05 C, 0.1 C, 0.2 C, 0.5 C, 1 C, 2 C, and 5 C rate. The high-rate charge/discharge test results are shown in Table 1 and FIG. 1.

TABLE 1

| C-rate | Comparative Example 3 (mAh/g) | Example 13 (mAh/g) | Example 14 (mAh/g) |
|---|---|---|---|
| 0.05 | 120.6 | 141.6 | 147.1 |
| 0.1 | 117.2 | 141.5 | 145.0 |
| 0.2 | 111.5 | 138.1 | 141.8 |
| 0.5 | 100.6 | 131.9 | 134.5 |
| 1 | 90.8 | 124.5 | 126.1 |
| 2 | 80.5 | 114.4 | 115.3 |
| 5 | 61.4 | 96.5 | 97.0 |

Referring to Table 1 and FIG. 2, the lithium batteries of Examples 13 and 14 manufactured using the composite cathode active materials of Examples 1 and 2, respectively, exhibited improved discharge capacity and high-rate characteristics as compared to the lithium battery of Comparative Example 3.

By way of summation and review, as a cathode active material with an olivine crystal structure, $LiFePO_4$ may be kept stable during charging and discharging without structural changes, may not cause a side effect of oxygen generation, and may be inexpensive. However, $LiFePO_4$ may exhibit low electrical conductivity and energy capacity.

The embodiments provide cathode active material having an olivine crystal structure and exhibiting improved electrical conductivity.

As described above, according to an embodiment, using a composite cathode active material including an inorganic material, a lithium battery may have improved high-rate characteristics and high discharge capacity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite cathode active material, comprising:
a compound having an olivine crystal structure; and
an inorganic material, the inorganic material including at least one selected from the group of a metal carbonitride and a carbonitride,
when the inorganic material includes the metal carbonitride, the metal carbonitride is represented by Formula 1, below:

$$M''_b C_{1-a} N_a \quad \text{[Formula 1]}$$

wherein, in Formula 1, $0<a<1$, $0<b<1$, and M''
is at least one element selected from the group of titanium, calcium, magnesium, zinc, nickel, cobalt, aluminum, zirconium, iron, copper, tantalum, niobium, vanadium, tungsten, molybdenum, silicon, uranium, and thorium, and
when the inorganic material includes the carbonitride, the carbonitride is represented by Formula 2 below:

$$C_{1-a} N_a \quad \text{Formula 2}$$

wherein, in Formula 2 above, $0<a<1$.

2. The composite cathode active material as claimed in claim 1, wherein the inorganic material includes the metal carbonitride, the metal carbonitride including at least one selected from the group of titanium carbonitride, calcium carbonitride, magnesium carbonitride, molybdenum carbonitride, zinc carbonitride, nickel carbonitride, cobalt carbonitride, aluminum carbonitride, zirconium carbonitride, iron carbonitride, and copper carbonitride.

3. The composite cathode active material as claimed in claim 1, wherein the inorganic material includes the carbonitride, the carbonitride including at least one selected from the group of $C_3N_4$, CN, and $C_3N$.

4. The composite cathode active material as claimed in claim 1, wherein the compound having the olivine crystal structure is represented by Formula 3, below:

$$Li_x Me_y M_z PO_{4-d} X_d \quad \text{[Formula 3]}$$

wherein, in Formula 3, $0.6 \le x \le 1.4$, $0<y \le 1$, $0 \le z<1$, and $0 \le d \le 0.2$;
Me includes at least one selected from the group of iron, manganese, nickel, and cobalt;
M includes at least one selected from the group of magnesium, calcium, copper, neodymium, strontium, barium, titanium, zirconium, niobium, molybdenum, tungsten, zinc, aluminum, and silicon; and
X includes at least one selected from the group of sulfur and fluorine.

5. The composite cathode active material as claimed in claim 1, wherein the compound having the olivine crystal structure is represented by Formula 4, below:

$$Li_x Mn_{1-z} M'_z PO_{4-d} X_d \quad \text{[Formula 4]}$$

wherein, in Formula 4, $0.6 \le x \le 1.4$, $0 \le z<1$, and $0 \le d \le 0.2$;
M' includes at least one selected from the group of Fe, Ni, Co, Mg, Ca, Cu, Nd, Sr, Ba, Ti, Zr, Nb, Mo, W, Zn, Al, and Si; and
X includes at least one selected from the group of sulfur and fluorine.

6. The composite cathode active material as claimed in claim 1, wherein the compound with the olivine crystal structure includes at least one selected from the group of $LiFePO_4$, $LiFe_{1-a}Mn_aPO_4$ ($0<a<1$), and $LiMnPO_4$.

7. The composite cathode active material as claimed in claim 1, wherein the inorganic material is in the form of one selected from the group of a nanoparticle, a nanofiber, a nanomesh, and a nanotube.

8. The composite cathode active material as claimed in claim 1, wherein the inorganic material has a Mohs hardness that is greater than a Mohs hardness of the compound with the olivine crystal structure.

9. The composite cathode active material as claimed in claim 1, wherein the inorganic material has a Mohs hardness of about 1 or greater.

10. The composite cathode active material as claimed in claim 1, wherein the inorganic material has an electrical conductivity higher than that of amorphous carbon.

11. The composite cathode active material as claimed in claim 1, wherein the inorganic material has an electrical conductivity of about 10 S/cm or greater.

12. The composite cathode active material of claim 1, wherein the composite cathode active material is represented by Formula 5 or Formula 6, below:

$$(1-r)Li_x Me_y M_z PO_{4-d} X_d \cdot r M''_b C_{1-a} N_a \quad \text{[Formula 5]}$$

$$(1-r)Li_x Me_y M_z PO_{4-d} X_d \cdot r C_{1-a} N_a \quad \text{[Formula 6]}$$

wherein, in Formulae 5 and 6, $0.6 \le x \le 1.4$, $0<y \le 1$, $0 \le z<1$, $0 \le d \le 0.2$, $0<r<1$, $0<a<1$, and $0<b<1$;
Me includes at least one selected from the group of iron, manganese, nickel, and cobalt;
M includes at least one selected from the group of magnesium, calcium, copper, neodymium, strontium, barium, titanium, zirconium, niobium, molybdenum, tungsten, zinc, aluminum, and silicon;
M'' includes at least one selected from the group of titanium, calcium, magnesium, zinc, nickel, cobalt, aluminum, zirconium, iron, copper, tantalum, niobium, vanadium, tungsten, molybdenum, silicon, uranium, and thorium; and
X includes at least one selected from the group of sulfur and fluorine.

13. The composite cathode active material as claimed in claim 12, wherein $0.0001<r \le 0.3$.

14. The composite cathode active material as claimed in claim 1, wherein the composite cathode active material is represented by Formula 7 or Formula 8, below:

$$(1-r)Li_x Mn_{1-z} M'_z PO_{4-d} X_d \cdot r M''_b C_{1-a} N_a \quad \text{[Formula 7]}$$

$$(1-r)Li_x Mn_{1-z} M'_z PO_{4-d} X_d \cdot r C_{1-a} N_a \quad \text{[Formula 8]}$$

wherein, in Formulae 7 and 8, $0.6 \le x \le 1.4$, $0 \le z \le 0.2$, $0 \le d \le 0.2$, $0<r<1$, $0<a<1$, and $0<b<1$;
M' includes at least one selected from the group of Fe, Ni, Co, Mg, Ca, Cu, Nd, Sr, Ba, Ti, Zr, Nb, Mo, W, Zn, Al, and Si;
X includes at least one selected from the group of sulfur and fluorine; and
M'' includes at least one selected from the group of titanium, calcium, magnesium, zinc, nickel, cobalt, aluminum, zirconium, iron, copper, tantalum, niobium, vanadium, tungsten, molybdenum, silicon, uranium, and thorium.

15. The composite cathode active material as claimed in claim 14, wherein $0.0001 < r \leq 0.3$.

16. The composite cathode active material as claimed in claim 1, wherein the composite cathode active material further includes a carbonaceous material.

17. The composite cathode active material as claimed in claim 16, wherein the carbonaceous material is included in an amount of about 0.1 wt % to about 30 wt %, based on a total weight of the composite cathode active material.

18. A cathode comprising the composite cathode active material as claimed in claim 1.

19. A lithium battery comprising the cathode as claimed in claim 18.

20. The composite cathode active material as claimed in claim 1, wherein the inorganic material includes the carbonitride.

21. The composite cathode active material as claimed in claim 1, wherein M" is at least one element selected from the group of titanium, calcium, magnesium, zinc, aluminum, zirconium, iron, copper, tantalum, niobium, vanadium, tungsten, molybdenum, uranium, and thorium.

22. The composite cathode active material as claimed in claim 1, wherein the inorganic material includes the metal carbontride and the metal carbonitride is TiCN.

* * * * *